Nov. 18, 1924.
A. B. CASE
LAWN MOWER
Filed Aug. 18, 1922
1,516,419
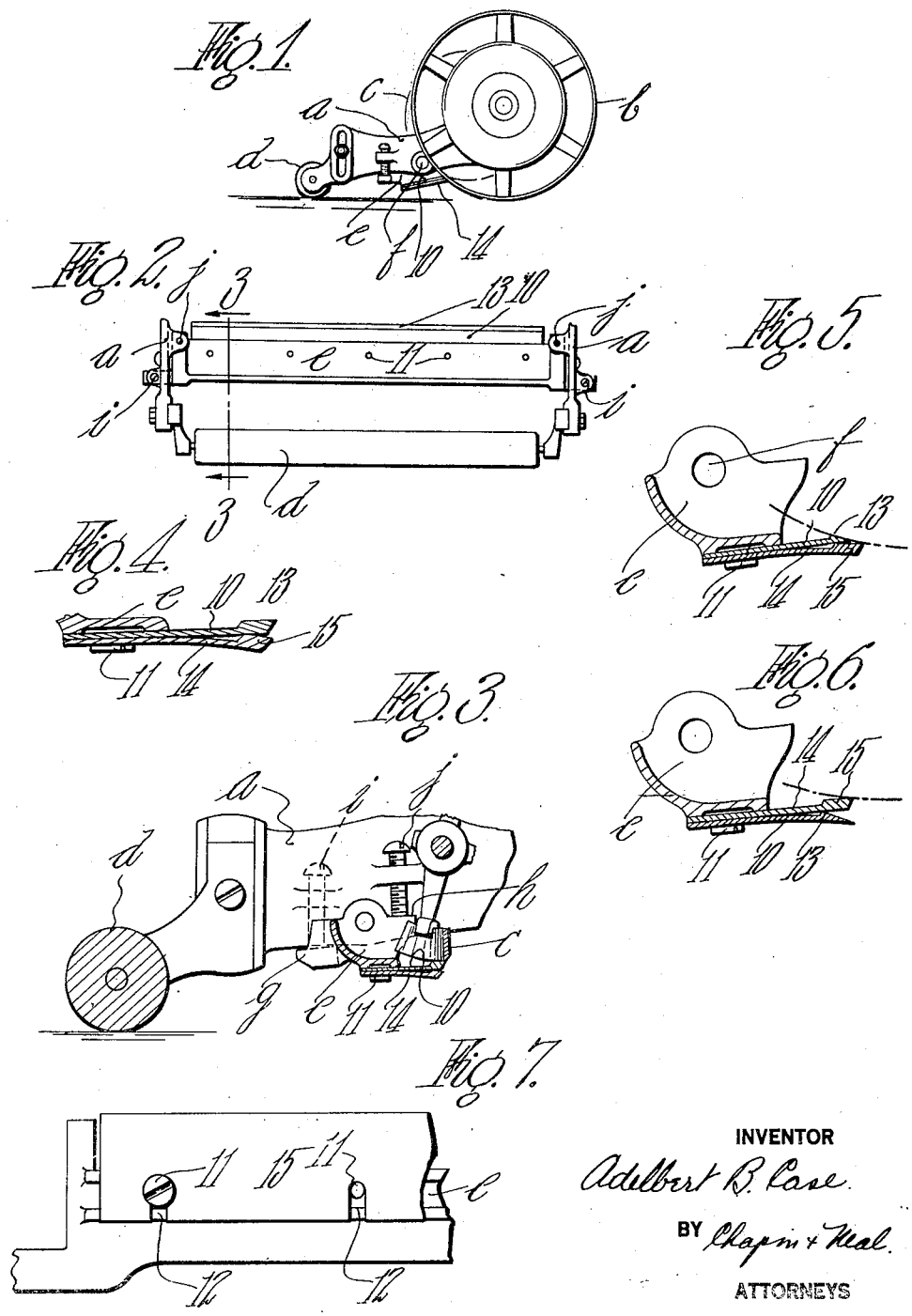
INVENTOR
Adelbert B. Case.
BY Chapin + Neal.
ATTORNEYS Patented Nov. 18, 1924.

1,516,419

UNITED STATES PATENT OFFICE.

ADELBERT B. CASE, OF SPRINGFIELD, MASSACHUSETTS; UNION TRUST COMPANY, ADMINISTRATOR OF THE ESTATE OF SAID ADELBERT B. CASE, DECEASED, ASSIGNOR TO BLAIR MANUFACTURING COMPANY, A CORPORATION OF MASSACHUSETTS.

LAWN MOWER.

Application filed August 18, 1922. Serial No. 582,764.

*To all whom it may concern:*

Be it known that I, ADELBERT B. CASE, citizen of the United States, residing at Springfield, in the county of Hampden and State of Massachusetts, have invented new and useful Improvements in Lawn Mowers, of which the following is a specification.

This invention relates to lawn mowers and more particularly to improvements in the cutting knives thereof.

The usual cutting knife is rigidly mounted on the mower frame and is also rigid under all usual operating conditions. A knife of this type must therefore be adjusted with close accuracy to the revolving spiral blades in order to shear perfectly from end to end and this adjustment has to be made by an expert because the work must be done within very close limits and be practically perfect.

Attempts have heretofore been made to avoid the necessity for such precise adjustment and to provide a cutting knife which could readily be adjusted to the revolving spiral blades by the relatively unskilled. The cutting knife has been made flexible and designed to yield when engaged by the spiral blades. Such a knife, even if set too closely into the path of the revolving spiral blades, could yield when required and still perform its function. Consequently, precise setting of the blades was not required and adjustments might be made even by the amateur.

Flexible cutting knives, of the type alluded to, have, however, been abandoned as a practical proposition, so far as I am aware. These knives, although advantageous in that they could yield to compensate for inaccuracies in adjustment, had a marked disadvantage in that the yielding was not controlled and frequently occurred when not desired. For example, the flexible knife might work properly on short and relatively tender grass, but, when heavy or tough grass was encountered, the knife would yield rather than cut.

This invention is concerned with, and has for an object, the provision of a cutting knife, which is flexible and resilient to permit the desirable advantages above set forth to be obtained, together with resilient means which are arranged to act upon the cutting knife, preferably near its cutting edge, in opposition to the pressure of the spiral blades thereon.

According to this feature of the invention, the flexibility of the knife is controlled and it is also automatically governed according to the particular operating conditions encountered. Thus, when cutting light grass the knife yields comparatively easily to compensate for inaccuracies of adjustment or irregularities in the spiral blades, but when heavier grass is encountered, such as would cause a flexible knife of the prior art to yield rather than cut, an increased opposition to the yielding movement is afforded by the resilient means which oppose the yielding of the knife and provide an opposition which increases according to the degree of flexure of the knife. To use a single flexible knife and make it stiff enough so that it would cut heavy grass would mean that an excessive pressure would exist between the spiral blades and knife when light grass is being cut and accordingly rapid wear on the cutting elements would ensue. The present invention provides a minimum of pressure between the cutting elements which is sufficient for ordinary light work and minimizes the wear and also provides for increasing pressure to make the mower perform heavy duty whenever necessary.

Another object of the invention is to provide for the supplementary resilient action by means of a flat thin member of resilient metal which is substantially similar to the knife itself and which is clamped against the latter near its rearward edge, such member having a raised lip adjacent its forward edge which contacts with the lower face of the knife, thereby causing the member to flex between the lip and the line along which it is clamped to the knife.

According to another feature of the invention the lip referred to has its upper face disposed parallel with the body of the supplementary resilient member, whereby when the member is clamped in place as described, the rear edge only of the lip contacts with the under face of the knife along a line spaced slightly to the rear of its cutting edge and a slight space is afforded between the front edge of the lip and the under face of the knife below its cutting edge.

According to another object of the invention, the supplementary resilient member may take the form of a second knife, which is interchangeable with the knife referred to, whereby the first knife when worn may be removed, placed below the second knife and made to function as a supplementary resilient support,—both knives preferably having a raised lip which is also desirable for other reasons as will later appear.

Other features and advantages will appear in the following description and in the illustrative embodiment of the invention in the accompanying drawings, in which;—

Fig. 1 is a side elevational view of a lawn mower embodying the invention;

Fig. 2 is a fragmentary top plan view thereof;

Fig. 3 is an enlarged cross sectional view taken on the line 3—3 of Fig. 2;

Fig. 4 is an enlarged fragmentary cross sectional view, taken similarly to Fig. 3;

Fig. 5 is a view similar to Fig. 4 showing the upper knife as worn down from extended service;

Fig. 6 is a view generally similar to Fig. 4 showing the worn knife interchanged with the supplementary knife to obtain a fresh cutting edge; and Fig. 7 is a bottom plan view of the knives and cutter bar showing the means for adjustably securing the blades to the bar.

Referring to these drawings: the lawn mower may be of any suitable type and construction and, as an illustrative example of one suitable type, there is shown a mower of the general kind disclosed in my prior U. S. Letters Patent No. 960,503, granted June 7, 1919. For the present purposes, it will suffice to state that $a$ indicates the usual spaced side plates, $b$ the traction wheels, $c$ the revoluble spiral blades driven therefrom (as in the manner shown in the patent above referred to), and $d$ the trailing roller. The bar for supporting the stationary knife is indicated at $e$ and may be mounted for adjustment relatively to the revoluble spiral blades $c$ in any suitable manner. As shown, bar $e$ is pivotally supported at its ends from the side plates $a$, the pivotal connection being designated $f$. Lugs $g$ and $h$ are provided at each end of bar $e$ which are designed to be engaged by screws $i$ and $j$, respectively, threaded into lugs located on the outer and inner sides, respectively, of the side plates $a$. By loosening screws $j$ and tightening screws $i$, bar $e$ may be swung toward the revoluble spiral blades $c$ and by reversing this operation the bar may be swung away from blades $c$.

The lawn mower, thus far described, is of a usual well-known construction too well understood in the art to require further description here. The particular type of mower illustrated and described is not important and various other types may be used as desired inasmuch as the invention is independent of the constructional details of the mower, and the one type shown has been given merely by way of illustrative example.

This invention is concerned primarily with the cutting knife itself, the characteristic feature of which is that the material used, the gage or thickness of such material and the distance between the cutting edge and the point constituting the fulcrum, are all designed to give a certain amount of flexibility to permit the described yielding action. Such a knife is shown at 10 in the drawings and may be made up of suitable material, such as steel, of proper gage and width. This knife is suitably and rigidly secured to bar $e$, as by screws 11, and is adjusted with relation to the spiral blades $c$ by means of screws $i$ and $j$ in the manner already described. The knife 10 has a plurality of slots 12, one for each screw 11, as best shown in Fig. 6, whereby to permit adjustment of the knife toward or away from the spiral blades $c$. The screws 11 and slots 12 are preferred as a fastening arrangement for knife 10, and another member shortly to be described, in that they permit the knife and member to be quickly applied in place on bar $e$ and as readily removed therefrom.

The knife 10 is preferably provided along its forward and cutting edge with a raised lip portion 13, whereby the cutting edge is made of ample thickness to give extended wear and yet the major portion of the knife is kept thin enough to permit the desired degree of flexibility.

The present invention is particularly characterized by the provision of supplementary resilient means which preferably act along the cutting edge of the knife in opposition to the pressure of the spiral blades thereon and function to control the yielding of the knife so as to prevent the disadvantages heretofore incident to the use of a flexible knife alone. This supplementary resilient means may, according to the broadest aspects of the invention, take various forms as desired but, as at present preferred, it takes the form of a thin, flat, member of resilient material such as steel which, is secured to the bar $e$ near its rearward edge and projects forwardly in underlying relation with the knife 10 and is provided with a raised lip portion 15 to contact with the knife substantially throughout its entire length. The member 14 is, in fact, preferably made exactly similar to the knife and interchangeable with the latter to perform its function when desired. To this end, it preferably has similar slots along its rearward edge for engagement by the screws 11, whereby it may be clamped to the knife and the latter clamped to bar $e$. The raised lip portion 15 may be formed in various ways, as desired, but preferably and advantageously it is formed when the member is rolled and takes the form of a thickened end for the member having an upper face substantially parallel to the body of the knife.

In clamping the members 10 and 14 in place on bar e, the tightening of screws 11 causes the member 14 to flex, intermediate the lip 15 and the line along which it is secured, and the member 14 is thereby placed under an initial stress. This stress is exerted upon the knife 10 through the medium of the raised lip 15, which contacts with the latter along its rearward edge,—the forward edge being thrown slightly below the under face of knife 10 by the flexing action, above alluded to, thereby leaving a slight space of a few thousandths of an inch between these portions. It is possible therefore for the knife 10 to bend to a limited degree without further flexing of member 14. That is, the forward portion of the knife can bend along its line of contact with the rear edge of lip 15 as a fulcrum until its under face completely contacts with the entire face of lip 15. This movement, however, is very slight due to the very small limits of the existing space as above described. Any further flexing or yielding of knife 10 will cause the member 14 to be flexed and any additional flexure of the latter will increase its stress in proportion to the degree of flexure so that flexure of the knife beyond a very small and limited extent is accompanied by an increasing force which opposes the pressure of the spiral blades on the knife. Accordingly when the mower strikes heavy grass, such as would cause a flexible knife to yield so much as to fail to cut, an additional force is automatically supplied to make the knife and spiral blades engage and cut the heavy grass. At the same time, this force is applied only when necessary and therefore does not result in rapid wear which would otherwise result.

The raised lip portion on the knife 10 permits extended wear to take place before the knife needs to be changed and is important in a flexible knife where the body of the latter must needs be made relatively thin to give the desired flexibility. The raised lip permits as much wear with the flexible knife as would be permitted by the ordinary non-flexible knife which has a thickness substantially double that of the body of knife 10. The latter may be used until it is worn down to the stage shown in Fig. 5. At such time the knife may be removed and the second knife afforded by the member 14 substituted for it. In doing this, the two elements are simply interchanged and each made to perform the function formerly performed by the other. The worn knife 10 will now act as the supplementary resilient means, which condition is illustrated in Fig. 6.

It is to be particularly noted that as the spiral blades c wear down the knife 10 to the stage illustrated in Fig. 5, they also engage the forward end of member 14 and true it up so that it may subsequently be applied as a substitute for knife 10 without necessitating the fitting of it to the revoluble spiral blades c.

The members 10 and 14 together utilize substantially the same amount of metal as an ordinary non-flexible knife. Yet they afford the flexibility which the thicker knife lacks and, moreover, they afford a controlled flexibility which is lacking in the flexible knives as heretofore used. Furthermore, the two members together give double the wear of a single non-flexible knife of ordinary construction.

The invention has been disclosed herein, in an embodiment at present preferred, for illustrative purposes but the scope of the invention is defined by the appended claims rather than by the foregoing description.

What I claim is,—

1. In a lawn mower, in combination with the revoluble spiral blades thereof, a rigid transverse member adjacent said blades and stationary relatively thereto, a knife of resilient metal secured to said member and projecting therefrom into cooperative relation with said blades, said knife capable of being flexed by said blades in normal operation when necessary, and resilient means acting on said knife in a direction opposite to that in which it is flexed when engaged by said blades.

2. In a lawn mower, in combination with the revoluble spiral blades thereof, a relatively stationary knife of resilient metal mounted to cooperate with said blades and capable of being flexed by the latter in normal operation when necessary, and resilient means secured to said knife near its rearward edge and extending forwardly thereof and having a forwardly located portion to contact with said knife near its cutting edge and substantially throughout the entire length thereof.

3. In a lawn mower, side plates, revoluble spiral blades mounted therein, a bar supported by said side plates transversely thereof, a knife secured to said bar to cooperate with said blades and having sufficient resiliency to be flexed by the blades in normal operation whenever required, and a flat thin resilient blade below said knife secured along its rearward edge with the knife to said bar and having a lip along its opposite edge to contact with said knife near its cutting edge.

4. In a lawn mower, side plates, revoluble spiral blades mounted thereon, a bar supported by said side plates transversely thereof, a flat thin knife of resilient metal mounted on said bar and extending forwardly thereof terminating with a cutting edge for engagement by said blades, a second flat thin member of resilient metal and substantially coextensive in area with said knife, and a raised lip provided along one longitudinal edge of said member, means for clamping said member near its opposite edge against said knife and for holding the latter against said bar, said lip underlying the knife near its cutting edge and forcing the member to flex intermediate said edges, whereby a spring support is provided for said knife to oppose the pressure of the spiral blades thereon and to provide opposition to flexure of the knife which increases with the degree of flexure thereof.

5. In a lawn mower, side plates, revoluble spiral blades mounted thereon, a bar supported by said side plates transversely thereof, two similar and interchangeable knives, each of thin flat spring metal and having a raised lip along its cutting edge, one of said knives adapted to be superposed upon the other so that the lip of one underlies and contacts with the other near its cutting edge, and means for clamping said knives together near their opposite edges and to said bar.

6. In a lawn mower, side plates, revoluble spiral blades mounted thereon, a bar supported by said side plates transversely thereof, two similar and interchangeable knives, each of thin flat spring metal and having a raised lip along its cutting edge, each of said knives having a plurality of slots leading from its opposite edge and extending a short distance toward its cutting edge, one of said knives adapted to be superposed upon the other so that the lip of one underlies and contacts with the other near its cutting edge, and means passing through said slots for clamping said knives together near their opposite edges and to said bar.

7. In a lawn mower, in combination with the revoluble spiral blades thereof, a relatively stationary knife of resilient metal mounted to cooperate with said blades and capable of being flexed by the latter in normal operation when necessary, a flat thin blade substantially coextensive in area with said knife and having a raised portion adjacent one edge which portion is substantially parallel with the body of the blade, and means for clamping said blade near its opposite edge to said knife, the rearward edge of said lip adapted to contact with the knife near and parallel with its cutting edge whereby the blade is flexed between said lip and the line along which it is clamped and a slight space is formed between the under side of the knife and the forward edge of said lip.

In testimony whereof I have affixed my signature.

ADELBERT B. CASE.